Patented Nov. 14, 1939

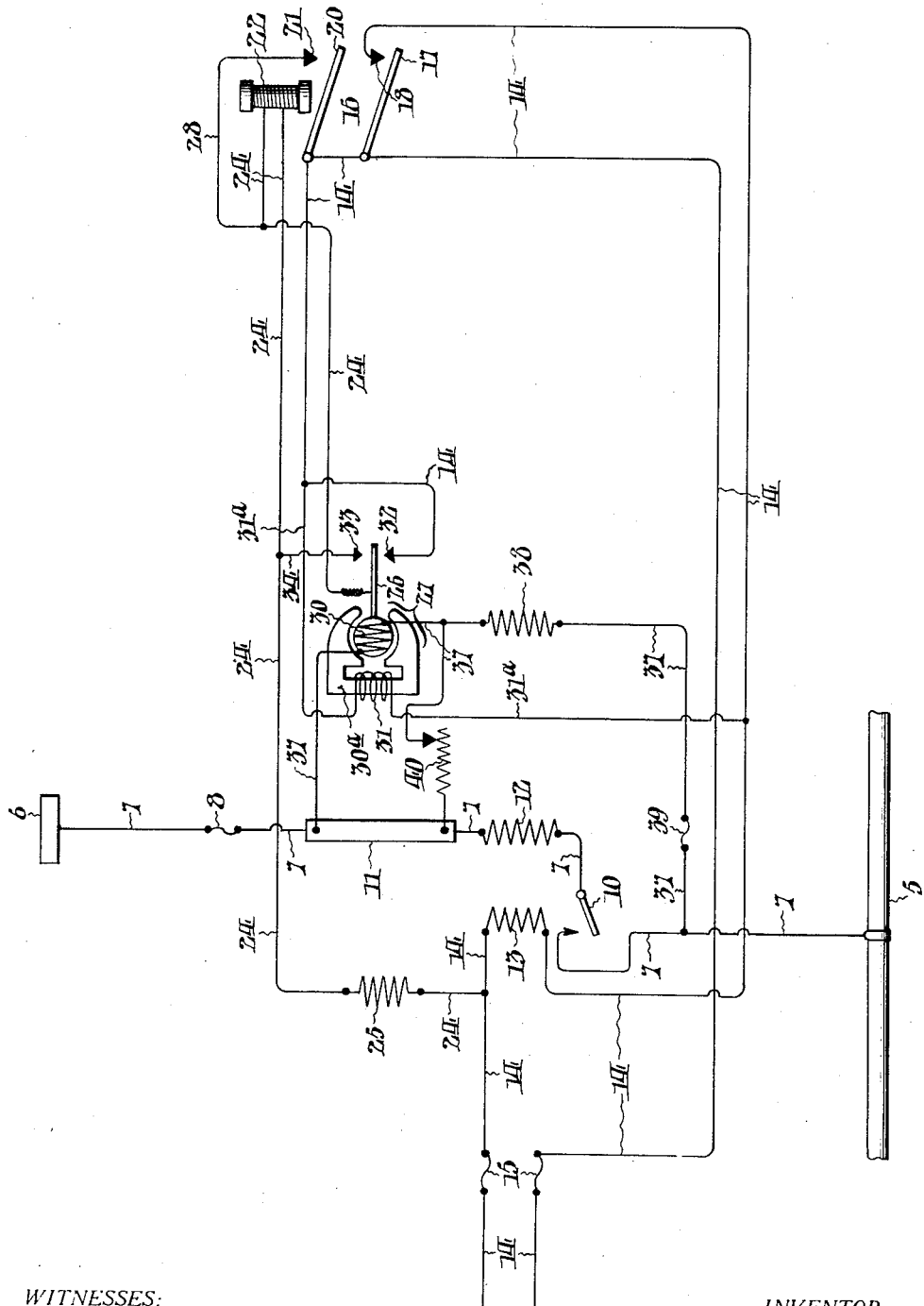

2,179,794

UNITED STATES PATENT OFFICE 2,179,794

AUTOMATIC REVERSE CURRENT SWITCH

James M. Loy, New York, N. Y., assignor to The Pennsylvania Railroad Company, Philadelphia, Pa., a corporation of Pennsylvania Application December 1, 1937, Serial No. 177,458

1 Claim. (Cl. 171—316)

This invention relates to automatic reverse current protection, and particularly to automatic switch mechanism for that purpose. I aim to make the mechanism reliable, even when traversed by stray alternating currents of appreciable magnitude, and free of any liability for a switch to "seal in" or stick in case of too rapid reversal of current; to provide ample margin of operating power to insure reliable action; and to obviate high cost of maintenance, which has been a general drawback of reverse current switch mechanisms heretofore tried. Another advantage afforded by the invention is that standard devices, already commercially available, can be used for the component parts of my switch mechanism or system, so that it need not be unduly expensive. The invention is especially adapted and advantageous for the protection of lead sheathed cable and the like against destructive electrolysis due to stray currents, and it is explained hereinafter with special reference to this use. Other underground structures may, of course, be similarly protected,—such as water or other pipes, structural steel members, etc.

A great deal of expensive underground lead sheathed electric cable is yearly rendered useless (and has to be removed and replaced, at large expense) owing to impairment of the lead sheath by electrolysis, due to stray currents. This is especially so in places where direct current railways operate. Merely to (electrically) bond or connect the lead sheath solidly to a substation negative bus bar or other drainage point does not solve the problem; for under the varying conditions of railway operation, the lead sheaths of cables may become negative in relation to the negative substation bus or other drainage point, instead of positive. Hence an automatic switch is needed in the bond to prevent the current from reversing to the cable sheaths. Protective devices recently employed for cables of telephone systems are not well suited for power cable, in many cases.

These problems and the drawbacks of automatic reverse-current switches hitherto used (whose disadvantages, such as suggested above, are largely due to their being self-actuated) are met and overcome by my invention. Still other features and advantages of the invention will appear from the following description of species or forms of embodiment, and from the drawing.

The drawing is a schematic diagram of operating devices and connections suitable for the purposes of the invention.

The drawing shows a portion of the underground metallic structure 5 to be protected,—such as a cable sheath (or system of such sheaths), a piping system, etc.,—and a drainage point 6 (such as the negative bus-bar of a direct current railway substation, or the like), with a bond or circuit 7 interconnecting them. This circuit 7 may include a fuse 8 for protecting the switch mechanism against extraordinary conditions, as well as an interrupting switch 10 that is intended to open in case the current flow through the circuit 7 reverses. The circuit 7 may also include a "shunt" portion 11 of definite low resistance, besides other resistance 12. The switch 10 may be of a self-opening type, with an operating coil 13 that closes it when energized by current flow therethrough. Such current may be supplied from an auxiliary power (and control) circuit 14 including said coil 13 (and also shown as including protective overload fuses 15, 15), under the control of an auxiliary switch relay 16 whose coacting movable and fixed contacts 17, 18 are connected in (or across) said circuit 14.

As shown, the auxiliary switch relay 16 includes additional coacting movable and fixed contacts 20, 21, the former of which is connected to an extension of one side of the circuit 14. The operating coil 22 of this relay 16 is in a circuit 24 one end of which is connected to one side of circuit 14, and may include a resistance 25. The other end of circuit 24 is connected to the movable (floating) contact 26 of a sensitive polarized potential relay switch 27, for controlling the energization of coil 22 of relay 16. The circuit 24 has a branch extension 28 connected to the contact 21 of relay switch 16. The relay switch 27 is shown as of known type having a moving coil 30 operating between the poles of a (soft iron) core 30a in the heavily saturated field of a coil 31, which latter is connected by a circuit 31a to any suitable source of energy,—as here shown, across the auxiliary power circuit 14,—so as to serve as a polarizing coil. Thus the circuit for energizing coil 31 is from one side of circuit 14 through one lead 31a, through the coil 31 itself and through the other lead 31a to the other side of circuit 14. The saturation of the magnet poles of core 30a makes the relay 27 insensitive in its operation to any ordinary voltage change in circuit 14; and the mounting of the moving coil 30 provides appreciable damping of the movements of the relay and its floating contact 26,—which reduces undesirable alternating current effects without interfering with the desired operation of the relay. The movable contact 26 of the relay 27 coacts alternatively with "front and back" contacts 32, 33, according to the direction of current flow through the coil 30. To contact 32 is connected an extension of the same side of circuit 14 to which the movable contacts 17, 20 of relay switch 16 are connected, and to contact 33 is connected a short-circuit lead 34 that is connected to that part of circuit 24 which connects resistance 25 to coil 22. The resistance 25 allows coil 22 to be short-circuited through the connection 34, and thus de-energized, without opening control circuit 14 or interfering with proper operation of the system.

For controlling the energization of coil 22 of relay 16 according to the potential from time to time existing between the sheath of cable 5 and the drainage point 6, the coil 30 of relay switch 27 is connected between them as a potential coil, in parallel with the interrupting switch or circuit breaker 10, being included in a circuit 37 which may conveniently be connected to said circuit 7 in shunt with switch 10 and also (preferably) with the portion 11 and the resistance 12. This shunt circuit 37 may itself include resistance 38 and a fuse 39, to afford protection against excessive current due to high voltage drop between the contacts of switch 10 when open. Thus the circuit for initially energizing coil 30 is from one end of resistance 11 in circuit 7 through lead 37, coil 30, and lead 37 (including resistance 38 and fuse 39) to circuit 7 again. An adjustable resistance 40 may be connected between the circuits 7 and 37, as shown, to assure satisfactory relative values of the current through coil 30 when switch 10 is open and closed. This connection may not materially affect the current through coil 30 when switch 10 is closed; but when switch 10 is open, resistances 11 and 40 are in parallel with coil 30.

The relay switch 27 is shown in neutral position, with its contact 26 disengaged from both contacts 32, 33, and with relay switch 16 and main circuit-breaker 10 both open,—a condition naturally obtaining when the system is initially being put into service, before any of its circuits are energized. Ordinarily, the sheath of cable 5 should be at a positive potential relative to the drainage point 6. When this positive potential reaches a value of about .25 volt (or whatever suitable value is determined by the design and setting of relay 27 and the value of resistance 38), contact 26 engages contact 32 and thus completes the circuit through coil 22, energizing the latter to operate relay 16 and close contacts 17, 18. The circuit which thus initially energizes coil 22 is from one side of circuit 14 through contact 32, contact 26, one lead 24, coil 22, and the other lead 24 and its resistance 25 to the other side of circuit 14. This closes contact 17 to complete circuit 14 and energize coil 13 of switch 10, closing the latter so as to complete circuit 7, and thus providing a low resistance path for current from cable sheathing 5 to drainage point 6. The closing of switch 10 also shunts out resistance 38 in series with coil 30, leaving coil 30 subject only to the small voltage drop (measurable in millivolts) determined by the relative values of resistances 11 and 40. The closing operation of relay 16 as above set forth also closes contacts 20, 21, completing a circuit 14—28—24—22—24—25—24—14 which energizes coil 22 independently of engagement between contacts 26 and 32.

If the voltage between cable sheath 5 and drainage point 6 should decrease to zero or become reversed, so that the current through circuit 7 correspondingly decreases or is reversed, then the current through coil 30 of relay 27 will recrease or reverse in proportion. As the current through this coil 30 decreases sufficiently, the relay 27 will operate to open the circuit through its contacts 26 and 32,—which, however, are still shunted by the contacts 20, 21 of relay 16. By the time the current flow through coil 30 has decreased to zero, or has reversed slightly (as determined by the setting of the relay 27), the relay 27 will have closed its contacts 26, 33, shunting coil 22 of relay 16 through circuit 34. As this coil 22 of relay 16 is in circuit through contacts 20, 21 independently of contacts 26, 32, coil 22 is not deenergized (nor relay 16 operated) by mere separation of contacts 26 and 32, but only by engagement of contacts 26 and 33. The shunt circuit thus established extends from one side of circuit 14 through contacts 20 and 21, circuit 28( one lead 24, contacts 26 and 33, circuit 34, and the other lead 24 (including resistance 25) to the other side of circuit 14. This shunts out coil 22, deenergizing it and allowing contacts 17, 20 of relay 16 to drop out and open circuit 14 (as well as circuit 28), which in turn deenergizes coil 13 and allows switch 10 to open. This breaks the circuit 7 and prevents injury to the cable sheathing by current flow in the wrong direction,—resistance 38 being so high that no appreciable flow to cause electrolysis can take place through circuit 37.

The proper value for resistance 38 and for the sensitivity of relay 27 are determined by the maximum reverse voltage likely to be experienced, and from the closing and opening voltages desired for the switch 10. Types of switches and relays available commercially give performance well within what is needed under practical conditions. For the relay 27, a type that is appreciably damped against the effect of stray alternating current is naturally preferred; and since its contacts are relieved of load as soon as contact is made, no objectionable stray current effects occur in practice.

Having thus described my invention, I claim:

The combination with a protective electric drainage connection for preventing electrolysis of an underground structure, an interrupter interposed in said connection, and an operating coil for causing said interrupter to open and close, of a polarized potential relay switch having a potential winding connected in parallel with said interrupter, across its gap, and a polarizing winding with connections for energizing it, an auxiliary power and control circuit independent of said drainage connection, with a relay switch controlling said latter circuit and the energization of the operating coil of said interrupter, and circuit means for the energization and operation of said latter relay switch controlled by said polarized potential relay switch.

JAMES M. LOY.